US012164624B1

(12) United States Patent
Palanki et al.

(10) Patent No.: US 12,164,624 B1
(45) Date of Patent: Dec. 10, 2024

(54) MACHINE LEARNING ASSISTED IDENTIFICATION OF SECURITY PATTERNS

(71) Applicant: American Express Travel Related Services Company, Inc., New York, NY (US)

(72) Inventors: Hiranmayi Palanki, Tampa, FL (US); Shankar Djeyassilane, Toronto (CA)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 256 days.

(21) Appl. No.: 17/549,284

(22) Filed: Dec. 13, 2021

(51) Int. Cl.
*G06F 21/52* (2013.01)
*G06N 20/20* (2019.01)

(52) U.S. Cl.
CPC .............. *G06F 21/52* (2013.01); *G06N 20/20* (2019.01); *G06F 2221/033* (2013.01)

(58) Field of Classification Search
CPC .......... G06F 21/52; G06F 21/54; G06F 21/56; G06F 2221/033; G06N 20/20
See application file for complete search history.

(56) References Cited

U.S. PATENT DOCUMENTS

| | | | | |
|---|---|---|---|---|
| 8,141,131 B2* | 3/2012 | Nakamura | ............. | G06F 21/604 713/193 |
| 2014/0130171 A1* | 5/2014 | Chiang | ................. | G06F 21/577 726/25 |
| 2020/0336506 A1* | 10/2020 | Levin | ...................... | G06F 40/30 |
| 2022/0103589 A1* | 3/2022 | Shen | .................. | G06Q 10/0635 |

* cited by examiner

*Primary Examiner* — Esther B. Henderson
(74) *Attorney, Agent, or Firm* — Thomas Horstemeyer, LLP (57) ABSTRACT

Disclosed are various embodiments for using machine learning models to identify appropriate security patterns to follow during the application development process. A computing device can receive a request to identify a collection of security patterns to apply to an application and then identify a plurality of features associated with the application. Next, the computing device can submit the plurality of features to a random forest machine learning model and receive a first set of security patterns in response. Then, the computing device can submit the plurality of features to a k-nearest neighbor (KNN) machine learning model and receive a second set of security patterns in response. Then, the computing device can identify a subset of the security patterns that is included in both the first set of security patterns and the second set of security patterns and return the subset of the security patterns.

18 Claims, 4 Drawing Sheets

MACHINE LEARNING ASSISTED IDENTIFICATION OF SECURITY PATTERNS

BACKGROUND

Secure application development is a difficult process. Developers often have to write code in a secure fashion. To do so, they may create a threat model for the application that identifies the types of security threats the application faces and the mitigation techniques to be used. However, threat modelling can become exceptionally complicated for large applications with many components, which may interact in unpredictable ways.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for using machine learning to assist in identifying appropriate security patterns to be followed when developing an application. Security patterns, which define controls and safeguards that can be used to mitigate threats an application may face, are often selected by developers based on the features of their application. For example, a publicly facing web-based application may follow one set of security patterns, while an application written in a language such as C or C++ which lacks automatic garbage collection or memory safeguards might follow a second set of security patterns. However, selecting the appropriate security patterns for a given set of features is currently a manual process that can be laborious if an application relies on a large set of components. Moreover, simple automated processes that rely on a series of conditionals to determine which security patterns to follow will often identify unnecessarily large sets of security patterns or select conflicting security patterns, when a smaller set of security patterns would be sufficient and contain no conflicts.

To solve these problems, the various embodiments of the present disclosure use a combination of machine learning models to identify a set of security patterns that would be appropriate for an application. The use of the combination of machine learning models improves the accuracy and suitability of the security patterns selected. Moreover, the sets of security patterns that are selected are not unnecessarily large and can be selected in an efficient manner.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
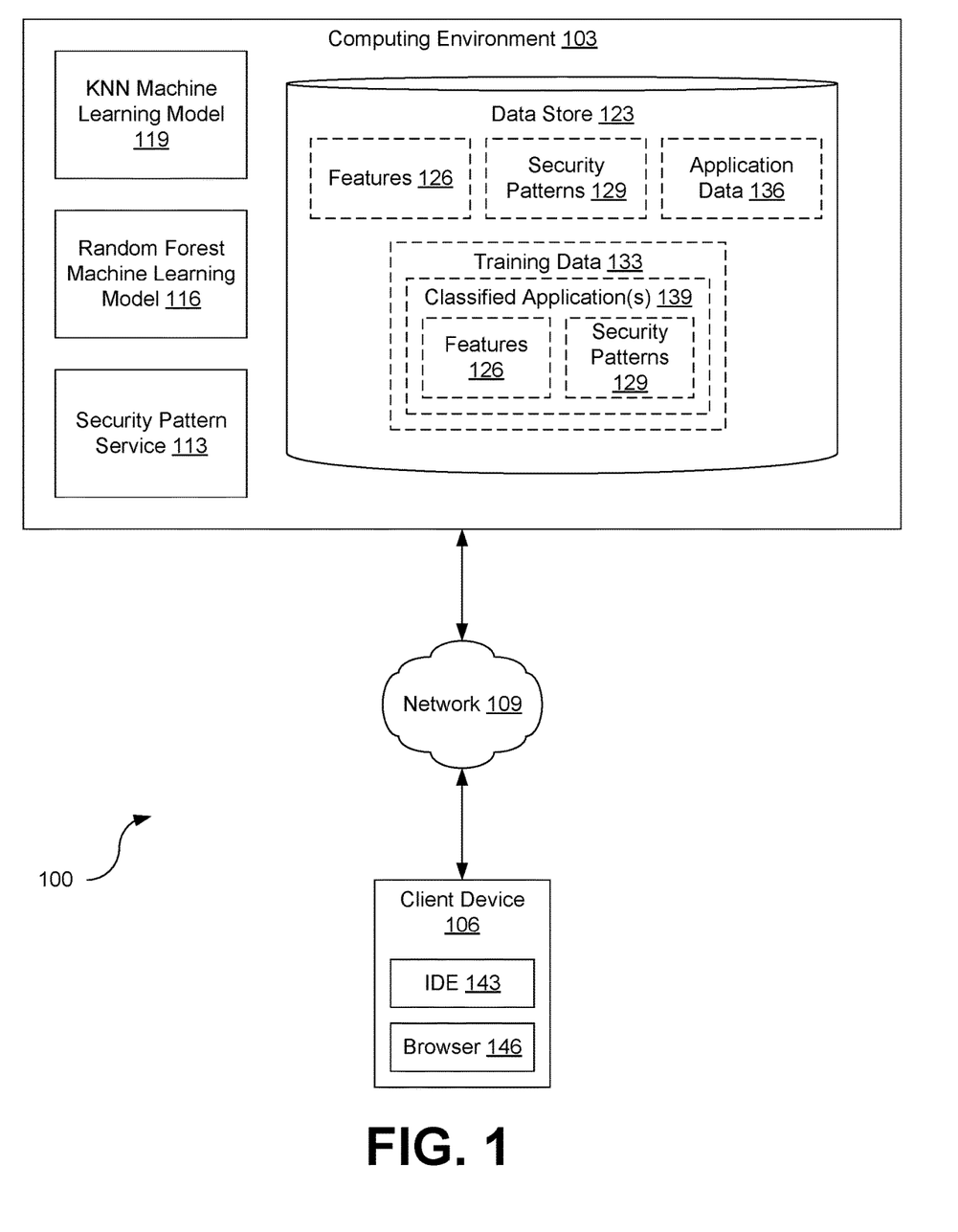
FIG. 1 is a drawing of a network environment according to various embodiments of the present disclosure.

FIG. 1 depicts a network environment 100 according to various embodiments. The network environment 100 can include a computing environment 103 and one or more client devices 106. The computing environment 103 and the client devices 106 can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a security pattern service 113, random forest machine learning model 116, and a k-nearest neighbor (KNN) machine learning model 119. Other applications, services, processes, systems, engines, or functionality not discussed in detail herein can also be executed by the computing environment 103.

Also, various data is stored in a data store 123 that is accessible to the computing environment 103. The data store 123 can be representative of a plurality of data stores 123, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 123 is associated with the operation of the various applications or functional entities described below. This data can include one or more features 126, one or more security patterns 129, training data 133, and application data 136, as well as potentially other data.

A feature 126 can represent a label for an architectural component of an application, and an application can have multiple features 126. For example, an application that interacts with a Representational State Transfer (REST) application programming interface (API) could be said to have a "REST API" feature 126. If the REST API that the application interacts with is provided by a third-party, the application could have a "Third-Party API" feature 126. As another example, if the application is written in a combination of languages, such as C, JAVA, and PYTHON, the application could have a "C Language" feature 126, a "JAVA Language" feature 126, and a "PYTHON Feature" 126. Other features may be defined as desired for a particular implementation. Each feature 126 can be mapped to, or associated with a respective security pattern 129.

A security pattern 129 can represent a collection of controls and safeguards that can be used to mitigate threats that a particular architectural component will face or introduce into an application. Accordingly, a security pattern 129 can include software libraries that a developer could use, code examples that illustrate how to safely and securely program in a manner that mitigates one or more threats, and/or a list of controls, safeguards, or security measures that are required to be implemented when the architectural component is used. For example, a security pattern 129 for a "C Language" feature 126 could include software libraries that include memory-safe functions, examples of coding a memory-safe manner, and a requirement that the memory-safe functions be used instead of the functions provided by the C standard library. As another example, a "SQL Database" feature 126 could have a respective security pattern 129 that includes examples of how to sanitize input data to prevent SQL injection attacks and/or a requirement to only interact with a SQL database using stored procedures or after input data has been sanitized to prevent a SQL injection attack. Other security patterns 129 may be created or defined for respective features 126 present in a particular implementation.

The training data 133 can represent data used to train the KNN machine learning model 119 and/or the random forest machine learning model 116. Training data 133 can include one or more classified applications 139 which have already had one or more security patterns 129 applied based at least in part on the identified features 126.

The application data 136 can represent data and/or metadata about an application that is to be analyzed by the KNN machine learning model 119 and/or the random forest machine learning model 116. Application data 136 can include source code for an application, architectural diagrams for the application, developer specified lists of architectural components that the application includes or utilizes, etc.

The security pattern service 113 can be executed to analyze the application data 136 for an application to identify appropriate security patterns 129 to use for the application. Accordingly, the security pattern service 113 can identify the features 126 associated with the application and provide those features 126 to both the KNN machine learning model 119 and the random forest machine learning model 116. The security pattern service 113 can then analyze the results from the KNN machine learning model 119 and the random forest machine learning model 116 to determine an accurate and/or appropriate set of security patterns 129 that should be applied to the application.

The random forest machine learning model 116 can be executed to identify a set of security patterns 129 to apply to an application based at least in part on the features 126 of the application. For each feature 126, the random forest machine learning model 116 can use a collection of random decision trees to identify a proposed security pattern 129 to use for the feature 126. The random decision trees can be generated by the random forest machine learning model 116 using the training data 133. The security pattern 129 that is most frequently selected using the random decision trees can then be selected as the appropriate security pattern 129 to utilize for the application.

The KNN machine learning model 119 can be executed to determine whether security patterns 129 selected using the random forest machine learning model 116 are appropriate. The KNN machine learning model 119 can be trained using the training data 133 to identify those security patterns 129 that are within a predefined distance of a feature 126. The KNN machine learning model 119 can then be used to determine whether a security pattern 129 selected by the random forest machine learning model 116 is an appropriate security pattern 129 by determining if the selected security pattern 129 is one that the KNN machine learning model 119 has identified as being within a predefined distance of the feature 126.

The client device 106 is representative of a plurality of client devices that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as an integrated development environment (IDE) 143, a browser 146, or other applications. The IDE 143 can be executed by a client device 106 to facilitate the development of software applications by a user of the client device 106. The IDE 143 could provide a number of facilities to a user, including a source code editor, build and build automation tools, a debugger, a compiler and/or interpreter. Accordingly, the IDE 143 could cause a user interface to be shown on the display, thereby allowing the user to interact with the IDE 143 and view messages presented by the IDE 143 to the user.

The browser 146 can reflect any web browser or similar application for interacting with web pages or web applications. The browser 146 could be used, for example, to allow a developer or other user to upload or provide application data 136 to the security pattern service 113, such as a list of features 126 used by the application to be evaluated.

Next, a general description of the operation of the various components of the network environment 100 is provided. Although the following description provides one example of the interaction between the various components of the network environment 100, it is understood that other interactions are also possible according to various embodiments of the present disclosure. More detailed description of the operation of individual components of the network environment 100 is provided in the discussion of FIGS. 2-5.

To begin, a user can submit a request to the security pattern service 113 for an application to be analyzed and the appropriate security patterns 129 be identified. This could be done a number of ways. For example, during the application design phase, design documents such as application architecture diagrams, flow charts, library dependencies, etc. could be uploaded to the data store 123 for processing by the security pattern service 113. In another example, a user could submit a list of features 126 that the application is planned to have. Either of these examples would allow a user to determine which security patterns 129 needs to be followed as the application is developed. As an alternative example, during the development phase, source code files could be uploaded to the data store 123 for processing by the security pattern service 113. This would allow a user to confirm that the appropriate security patterns 129 were followed when the application was developed.

Once application data 136 has been uploaded, the security pattern service 113 can identify the application data 136 to determine which features 126 are present in the application. The security pattern service 113 can then submit the features 126 to the random forest machine learning model 116 to identify a proposed set of security patterns 129 for use with the application.

The security pattern service 113 could then use the KNN machine learning model 119 in one of several potential ways to confirm the appropriateness of the security patterns 129 selected by random forest machine learning model 116. In a first approach, the security pattern service 113 could submit both the features 126 of the application and the selected security patterns 129 to the KNN machine learning model 119 to determine whether the selected security patterns 129 are the nearest neighbors to their respective features 126 (e.g., that the selected security patterns 129 are within a predefined distance of the respective features 126, indicating that the security pattern 129 is commonly applied when the respective feature 126 is present). In a second approach, the security pattern service 113 could submit the features 126 of the application to the KNN machine learning model 119, and receive a set of security patterns 129 that are nearest neighbors to each respective one of the features 126. The security pattern service 113 could then cross-reference the security patterns 129 selected by the random forest machine learning model 116 with those identified by the KNN machine learning model 119 to determine whether any of the security patterns identified by the random forest machine learning model 116 are absent from the security patterns identified by the KNN machine learning model 119. Any security patterns 129 that are not present in both sets of security patterns 129 could be omitted as an erroneous determination.

The security pattern service 113 could then return the identified security patterns 129 to the user. For example, a list of security patterns 129 could be presented on a web page rendered by the browser 146 or could be listed in a user interface displayed within the IDE 143. The user could then follow the identified security patterns 129 to develop the application in a secure manner.

Figure 2:
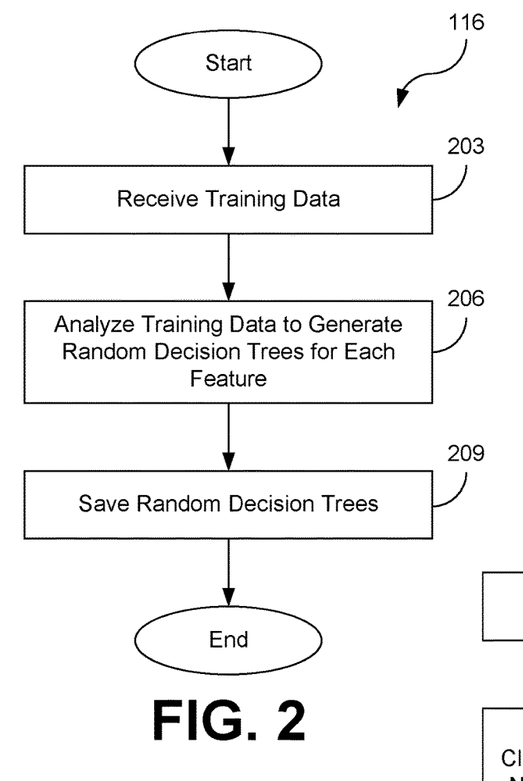
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the random forest machine learning model 116. The flowchart of FIG. 2 provides merely an example of the many different types of functional arrangements that can be employed to implement the operation of the depicted portion of the random forest machine learning model 116. As an alternative, the flowchart of FIG. 2 can be viewed as depicting an example of elements of a method implemented within the network environment 100.

Beginning with block 203, the random forest machine learning model 116 can receive training data 133. As previously described, this training data 133 can include a plurality of classified applications 139, each classified application 139 having one or more features 126 and one or more security patterns 129.

At block 206, the random forest machine learning model 116 can analyze the training data 133 to create a plurality of random decision trees for each feature 126 present in the training data 133. The plurality of random decision trees created for each feature 126 can be structured to output a security pattern 129 to be used for a respective feature 126 provided as an input. For each feature 126, individual ones of the plurality of random decision trees will represent a unique decision tree for determining which security pattern 129 to apply for a given feature 126.

Subsequently, at block 209, the random forest machine learning model 116 can save the random decision trees created at block 206. These random decision trees will allow the random forest machine learning model 116 to identify which security patterns 129 should be followed for newly developed or designed applications.

Figure 3:
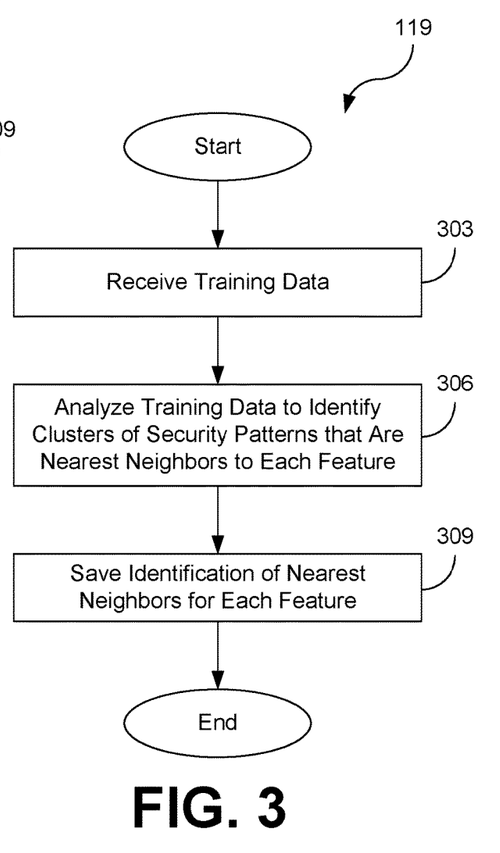
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the KNN machine learning model 119. The flowchart of FIG. 3 provides merely an example of the many different types of functional arrangements that can be employed to implement the operation of the depicted portion of the KNN machine learning model 119. As an alternative, the flowchart of FIG. 3 can be viewed as depicting an example of elements of a method implemented within the network environment 100.

Beginning with block 303, the KNN machine learning model 119 can receive training data 133. As previously described, this training data 133 can include a plurality of classified applications 139, each classified application 139 having one or more features 126 and one or more security patterns 129.

At block 306, the KNN machine learning model 119 can identify clusters of security patterns 129 for each feature 126 specified in the training data 133. The KNN machine learning model 119 can then select those security patterns that are within a predefined distance of the feature 126 as the nearest neighbors of the feature 126, representing the most frequently followed security patterns 129 for a respective feature 126.

Then, at block 309, the KNN machine learning model 119 can save the identification of the security patterns 129 that are the nearest neighbors of each feature 126. These groups of nearest neighbors can then be used to validate or verify the accuracy or appropriateness of future selections made by the random decision tree machine learning model 116.

Figure 4:
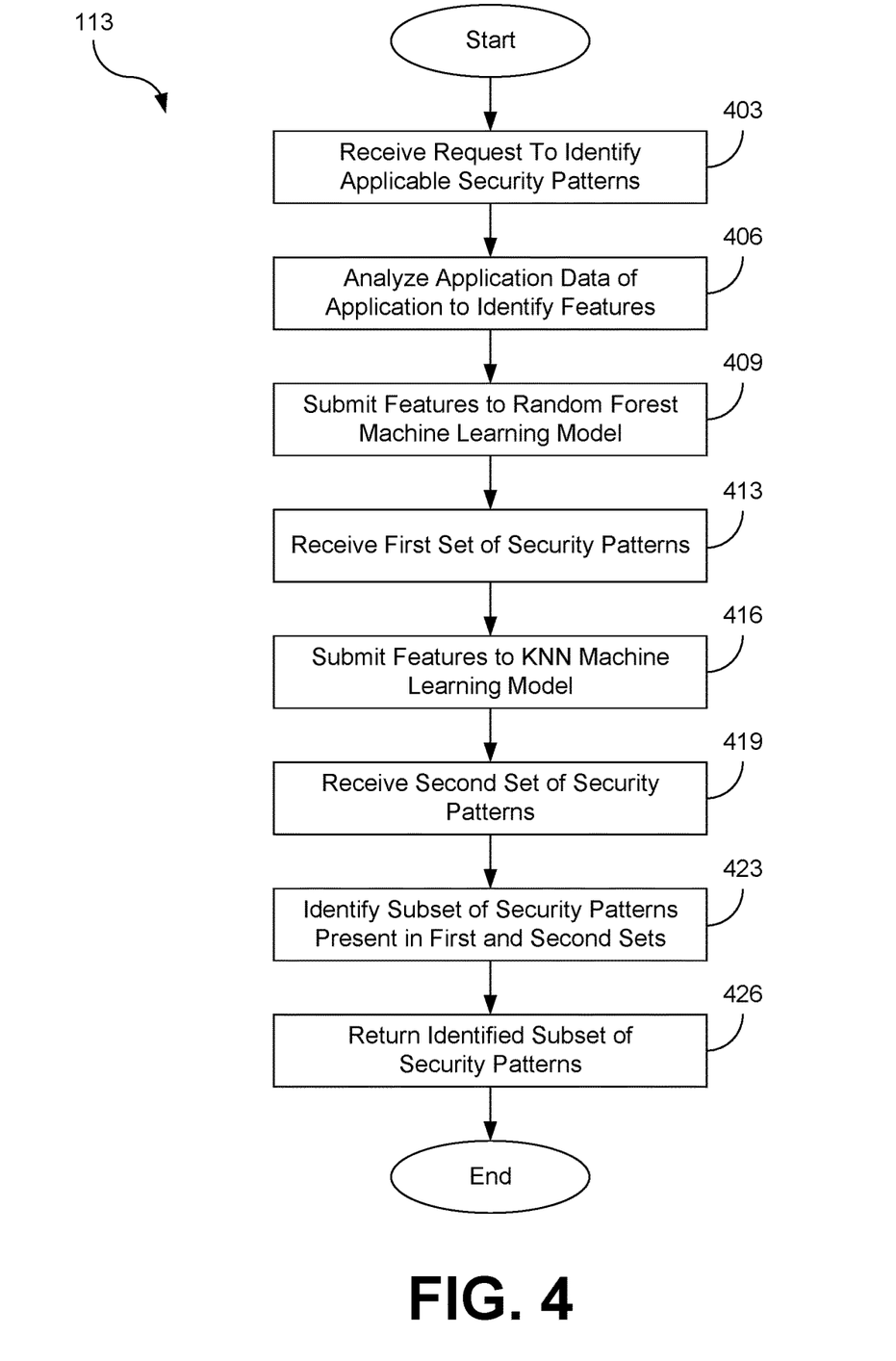
FIG. 4 is a flowchart illustrating one example of functionality implemented as portions of an application executed in a computing environment in the network environment of FIG. 1 according to various embodiments of the present disclosure.

Referring next to FIG. 4, shown is a flowchart that provides one example of the operation of a portion of the security pattern service 113. The flowchart of FIG. 4 provides merely an example of the many different types of functional arrangements that can be employed to implement the operation of the depicted portion of the security pattern service 113. As an alternative, the flowchart of FIG. 4 can be viewed as depicting an example of elements of a method implemented within the network environment 100.

Beginning with block 403, the security pattern service 113 can receive a request to identify one or more security patterns 129 that would be applicable to an application. The request could include either application data 136 for the application or it could specify application data 136 previously stored in the data store 123. In some instances, the request could also specify one or more features 126 of the application. The request could also be received from a number of sources, such as the IDE 143 or the browser 146 executing on the client device 106 in response to a user manipulation of the user interface of the IDE 143 or the user interacting with a web page rendered by the browser 146.

Then, at block 406, the security pattern service 113 can analyze the application data 136 received or specified at block 403 to identify one or more features 126 of the application. This can be done using a variety of approaches. In one example, such as where the application data 136 includes design documents (e.g., architecture diagrams, flowcharts, dependency lists, etc.), the security pattern service 113 could parse the design documents and analyze metadata associated with the design documents to identify the features 126 associated with the application. In another example, such as where the application data 136 includes the source code files of the application, the security pattern service 113 could parse or analyze the source code files to determine the features 126 of the application (e.g., the languages the developers used, the libraries or APIs the developers used, the type of functionality provided by the application, etc.). In a third example, if the request received at block 403 has specified the features 126 of the application (e.g., because they were selected or provided using a web page provided by the security pattern service 113 rendered in the browser 146 of the client device 106), then those specified features 126 could be used.

Next, at block 409, the security pattern service 113 can submit the features 126 identified at block 406 to the random forest machine learning model 116. The random forest machine learning model 116, which has been trained as previously described in the discussion of FIG. 2, can then identify a collection or set of security patterns 129 to be followed.

As previously discussed, for each feature 126, the random decision tree learning model 116 has a plurality of respective random decision trees. The random decision tree machine leaning model 116 can evaluate each of the random decision trees for a given feature 126 to identify a respective plurality of potential security patterns 129 to apply to the application. The random decision tree machine learning model 116 can then identify which of the security patterns 129 is most frequently selected for the feature 126. The most frequently selected security pattern 129 can then be selected by the random decision tree machine learning model 116 as a security pattern 129 to be followed. Where multiple features 126 result in a selection of the same security pattern 129, the random forest machine learning model 116 can deduplicate the repeated selections of security patterns 129. The random forest machine learning model 116 can then return the selected security patterns 129 to the security pattern service 113.

Proceeding to block 413, the security pattern service 113 can receive the selected security patterns from the random forest machine learning model 116.

Moving on to block 416, the security pattern service 113 can submit the features 126 identified at block 406 to the KNN machine learning model 119. The KNN machine learning model 119, which has been trained as previously described in the discussion of FIG. 3, can then identify a collection or set of security patterns 129 to be followed. For example, the KNN machine learning model 119 could identify those security patterns 129 that are the nearest neighbors of the submitted features 126. The KNN machine learning model 119 could then return these nearest neighbor security patterns 129. Subsequently, at block 419, the security pattern service 113 can receive from the KNN machine learning model 119 the nearest neighbor security patterns 129 identified by the KNN machine learning model 119.

Then, at block 423, the security pattern service 113 can identify a subset of security patterns 129 that represents the intersection or overlap of the first set of security patterns 129 identified by the random forest machine learning model 116 and the second set of security patterns 129 identified by the KNN machine learning model 119. By selecting the subset of security patterns 129 that are present in both the first set of security patterns 129 and the second set of security patterns 129, the security pattern service 113 can ensure that security patterns 129 selected for the application are appropriate in view of the features 126 of the application.

Next, at block 426, the security pattern service 113 can return the subset of security patterns 129 identified at block 423. For example, the security pattern service 113 could generate and save or send a report that lists the security patterns 129 to be followed. As another example, the security pattern service 113 could include the subset of security patterns 129 in a web page rendered by the browser 146 of the client device 106. Once the subset of the security patterns 129 are returned, the depicted process could end.

Figure 5:
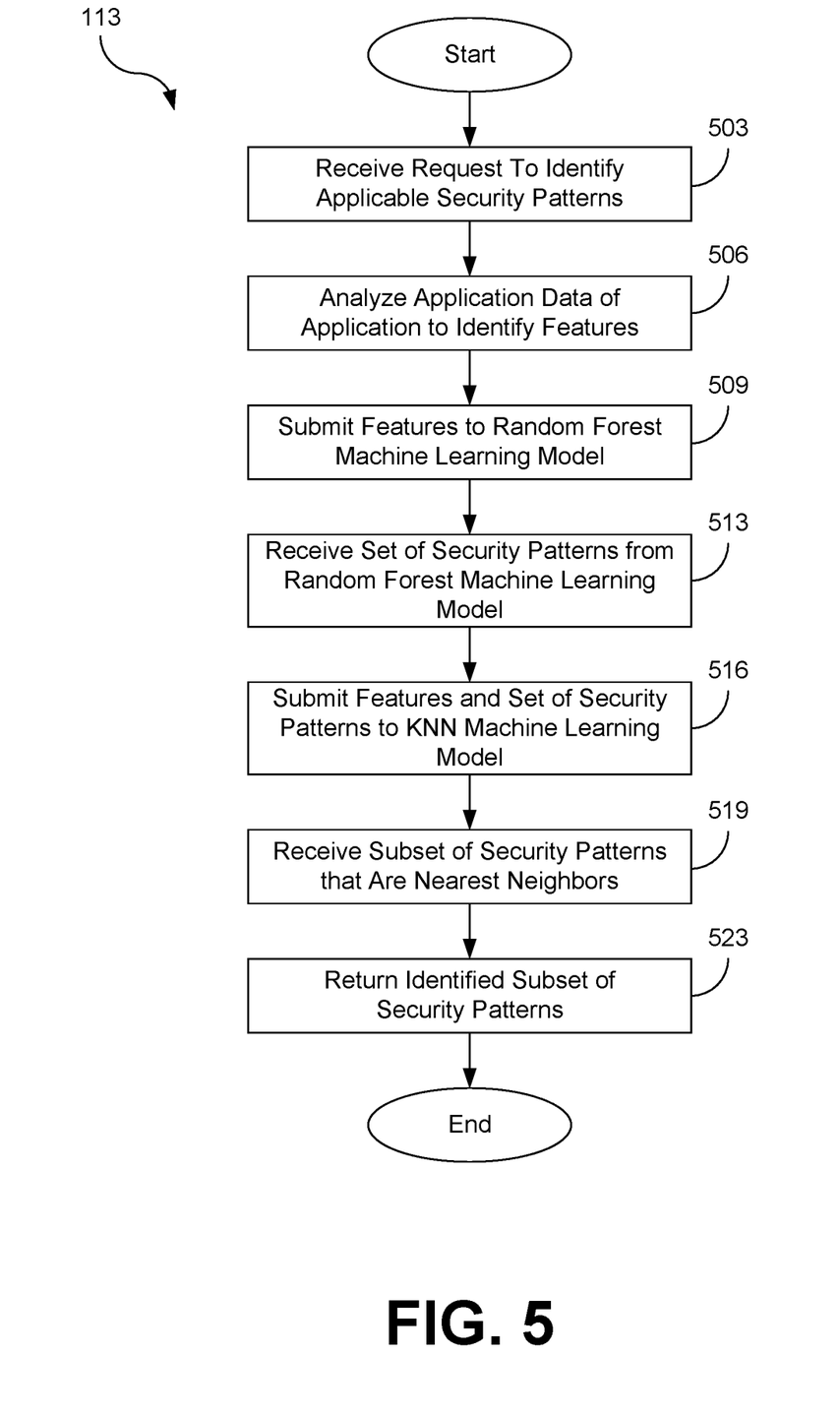
FIG. 5 is a flowchart illustrating one example of functionality implemented as portions of an application executed in a computing environment in the network environment of FIG. 1 according to various embodiments of the present disclosure.

Referring next to FIG. 5, shown is a flowchart that provides an alternative example of the operation of a portion of the security pattern service 113. The flowchart of FIG. 5 provides merely an example of the many different types of functional arrangements that can be employed to implement the operation of the depicted portion of the security pattern service 113. As an alternative, the flowchart of FIG. 5 can be viewed as depicting an example of elements of a method implemented within the network environment 100.

Beginning with block 503, the security pattern service 113 can receive a request to identify one or more security patterns 129 that would be applicable to an application. The request could include either application data 136 for the application or it could specify application data 136 previously stored in the data store 123. In some instances, the request could also specify one or more features 126 of the application. The request could also be received from a number of sources, such as the IDE 143 or the browser 146 executing on the client device 106 in response to a user manipulation of the user interface of the IDE 143 or the user interacting with a web page rendered by the browser 146.

Then, at block 506, the security pattern service 113 can analyze the application data 136 received or specified at block 503 to identify one or more features 126 of the application. This can be done using a variety of approaches. In one example, such as where the application data 136 includes design documents (e.g., architecture diagrams, flowcharts, dependency lists, etc.), the security pattern service 113 could parse the design documents and analyze metadata associated with the design documents to identify the features 126 associated with the application. In another example, such as where the application data 136 includes the source code files of the application, the security pattern service 113 could parse or analyze the source code files to determine the features 126 of the application (e.g., the languages the developers used, the libraries or APIs the developers used, the type of functionality provided by the application, etc.). In a third example, if the request received at block 403 has specified the features 126 of the application (e.g., because they were selected or provided using a web page provided by the security pattern service 113 rendered in the browser 146 of the client device 106), then those specified features 126 could be used.

Next, at block 509, the security pattern service 113 can submit the features 126 identified at block 406 to the random forest machine learning model 116. The random forest machine learning model 116, which has been trained as previously described in the discussion of FIG. 2, can then identify a collection or set of security patterns 129 to be followed.

As previously discussed, for each feature 126, the random decision tree learning model 116 has a plurality of respective random decision trees. The random decision tree machine leaning model 116 can evaluate each of the random decision trees for a given feature 126 to identify a respective plurality of potential security patterns 129 to apply to the application. The random decision tree machine learning model 116 can then identify which of the security patterns 129 is most frequently selected for the feature 126. The most frequently selected security pattern 129 can then be selected by the random decision tree machine learning model 116 as a security pattern 129 to be followed. Where multiple features 126 result in a selection of the same security pattern 129, the random forest machine learning model 116 can deduplicate the repeated selections of security patterns 129. The random forest machine learning model 116 can then return the selected security patterns 129 to the security pattern service 113.

Proceeding to block 513, the security pattern service 113 can receive the selected security patterns 129 from the random forest machine learning model 116.

Moving on to block 516, the security pattern service 113 can submit the to the KNN machine learning model 119 the features 126 identified at block 506 and the security patterns 129 selected by the random forest machine learning model 116 at block 509 and received at block 513. The KNN machine learning model 119 can then evaluate the features 126 and the security patterns 129 selected by the random forest machine learning model 116 to confirm that the security patterns 129 selected by the random forest machine learning model 116 are also a nearest neighbor of at least one feature 126. Each security pattern 129 that the KNN machine learning model 119 determines is not a nearest neighbor of at least one feature 126 can be removed from the set of security patterns 129 selected by the random forest machine learning model 116. The resulting set of security patterns 129 can represent the subset of security patterns 129 selected by the random forest machine learning model 116 that are appropriate for the application. Subsequently, at block 519, the security pattern service 113 can receive the selected security patterns 129 from the KNN machine learning model 119.

Then, at block 523, the security pattern service 113 can return the subset of security patterns 129 that were returned by the KNN machine learning model 119 at block 519. For example, the security pattern service 113 could generate and save or send a report that lists the security patterns 129 to be followed. As another example, the security pattern service 113 could include the subset of security patterns 129 in a web page rendered by the browser 146 of the client device 106. Once the subset of the security patterns 129 are returned, the depicted process could end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
      receive a request to identify a collection of security patterns to apply to an application, wherein individual security patterns represent a collection of controls and safeguards that can be integrated into the application to mitigate threats to the application and wherein at least one security pattern in the collection of security patterns comprises a software library comprising memory-safe functions or a requirement to interact with a structured query language (SQL) database using stored procedures;
      identify a plurality of features associated with the application;
      submit the plurality of features to a random forest machine learning model;
      receive a first set of security patterns from the random forest machine learning model;
      submit the plurality of features to a k-nearest neighbor (KNN) machine learning model;
      receive a second set of security patterns from the KNN machine learning model;
      identify a subset of the security patterns that is included in both the first set of security patterns and the second set of security patterns; and return the subset of the security patterns as the collection of security patterns to apply to the application.

2. The system of claim 1, wherein the random forest machine learning model comprises a plurality of random decision trees for each of the plurality of features, and the random forest machine learning model is further configured to cause the computing device to at least:
for each feature of the plurality of features, traverse each of the plurality of random decision trees associated with the feature to determine a resulting security pattern;
identify a most frequently selected resulting security pattern produced by traversal of each of the plurality of random decision trees associated with the feature; and
include the most frequently selected resulting security pattern in the first set of security patterns.

3. The system of claim 1, wherein the KNN machine learning model is further configured to cause the computing device to at least:
for each feature of the plurality of features, identify at least one security patterns within a predefined distance of the feature; and
include the at least one security pattern in the second set of security patterns.

4. The system of claim 1, wherein the machine-readable instructions that cause the computing device to identify the plurality of features associated with the application, when executed by the processor, further cause the computing device to at least:
analyze a source code file associated with the application; and
identify a feature in the plurality of features based at least in part on an analysis of the source code file.

5. The system of claim 1, wherein the machine-readable instructions that cause the computing device to identify the plurality of features associated with the application, when executed by the processor, further cause the computing device to at least:
analyze an application design document associated with the application; and
identify a feature in the plurality of features based at least in part on an analysis of a source code file.

6. The system of claim 1, wherein the machine-readable instructions that cause the computing device to identify the plurality of features associated with the application, when executed by the processor, further cause the computing device to at least:
analyze a list of features included in the request; and
identify a feature in the plurality of features based at least in part on an analysis of the list of features included in the request.

7. A method, comprising:
receiving a request to identify a collection of security patterns to apply to an application, wherein individual security patterns represent a collection of controls and safeguards that can be integrated into the application to mitigate threats to the application and wherein at least one security pattern in the collection of security patterns comprises a software library comprising memory-safe functions or a requirement to interact with a structured query language (SQL) database using stored procedures;
identifying a plurality of features associated with the application;
submitting the plurality of features to a random forest machine learning model;
receiving a first set of security patterns from the random forest machine learning model;
submitting the plurality of features to a k-nearest neighbor (KNN) machine learning model;
receiving a second set of security patterns from the KNN machine learning model;
identifying a subset of the security patterns that is included in both the first set of security patterns and the second set of security patterns; and
returning the subset of the security patterns as the collection of security patterns to apply to the application.

8. The method of claim 7, wherein the random forest machine learning model comprises a plurality of random decision trees for each of the plurality of features, and the method further comprises using the random forest machine learning model for:
for each feature of the plurality of features, traversing each of the plurality of random decision trees associated with the feature to determine a resulting security pattern;
identifying a most frequently selected resulting security pattern produced by traversal of each of the plurality of random decision trees associated with the feature; and
including the most frequently selected resulting security pattern in the first set of security patterns.

9. The method of claim 7, further comprising using the KNN machine learning for:
for each feature of the plurality of features, identifying at least one security patterns within a predefined distance of the feature; and
including the at least one security pattern in the second set of security patterns.

10. The method of claim 7, wherein identifying the plurality of features associated with the application further comprises:
analyzing a source code file associated with the application; and
identifying a feature in the plurality of features based at least in part on an analysis of the source code file.

11. The method of claim 7, wherein identifying the plurality of features associated with the application further comprises:
analyzing an application design document associated with the application; and
identifying a feature in the plurality of features based at least in part on an analysis of a source code file.

12. The method of claim 7, wherein identifying the plurality of features associated with the application further comprises:
analyzing a list of features included in the request; and
identifying a feature in the plurality of features based at least in part on an analysis of the list of features included in the request.

13. A non-transitory, computer-readable medium, comprising machine-readable instructions that, when executed by a processor of a computing device, cause the computing device to at least:
receive a request to identify a collection of security patterns to apply to an application, wherein at least one security pattern in the collection of security patterns comprises a software library comprising memory-safe functions or a requirement to interact with a structured query language (SQL) database using stored procedures;
identify a plurality of features associated with the application;

submit the plurality of features to a random forest machine learning model;

receive a first set of security patterns from the random forest machine learning model;

submit the plurality of features to a k-nearest neighbor (KNN) machine learning model;

receive a second set of security patterns from the KNN machine learning model;

identify a subset of the security patterns that is included in both the first set of security patterns and the second set of security patterns;

return the subset of the security patterns as the collection of security patterns to apply to the application; and wherein each security pattern in the first set of security patterns, the second set of security patterns, or a third set of security patterns represents a collection of controls and safeguards that can be integrated into the application to mitigate threats that a particular architectural component will face or introduce into the application.

14. The non-transitory, computer-readable medium of claim 13, wherein the random forest machine learning model comprises a plurality of random decision trees for each of the plurality of features, and the random forest machine learning model is further configured to cause the computing device to at least:

for each feature of the plurality of features, traverse each of the plurality of random decision trees associated with the feature to determine a resulting security pattern;

identify a most frequently selected resulting security pattern produced by traversal of each of the plurality of random decision trees associated with the feature; and include the most frequently selected resulting security pattern in the first set of security patterns.

15. The non-transitory, computer-readable medium of claim 13, wherein the KNN machine learning model is further configured to cause the computing device to at least:

for each feature of the plurality of features, identify at least one security patterns within a predefined distance of the feature; and include the at least one security pattern in the second set of security patterns.

16. The non-transitory, computer-readable medium of claim 13, wherein the machine-readable instructions that cause the computing device to identify the plurality of features associated with the application, when executed by the processor, further cause the computing device to at least:

analyze a source code file associated with the application; and identify a feature in the plurality of features based at least in part on an analysis of the source code file.

17. The non-transitory, computer-readable medium of claim 13, wherein the machine-readable instructions that cause the computing device to identify the plurality of features associated with the application, when executed by the processor, further cause the computing device to at least:

analyze an application design document associated with the application; and identify a feature in the plurality of features based at least in part on an analysis of the source code file.

18. The non-transitory, computer-readable medium of claim 13, wherein the machine-readable instructions that cause the computing device to identify the plurality of features associated with the application, when executed by the processor, further cause the computing device to at least:

analyze a list of features included in the request; and identify a feature in the plurality of features based at least in part on an analysis of the list of features included in the request.

* * * * *